UNITED STATES PATENT OFFICE.

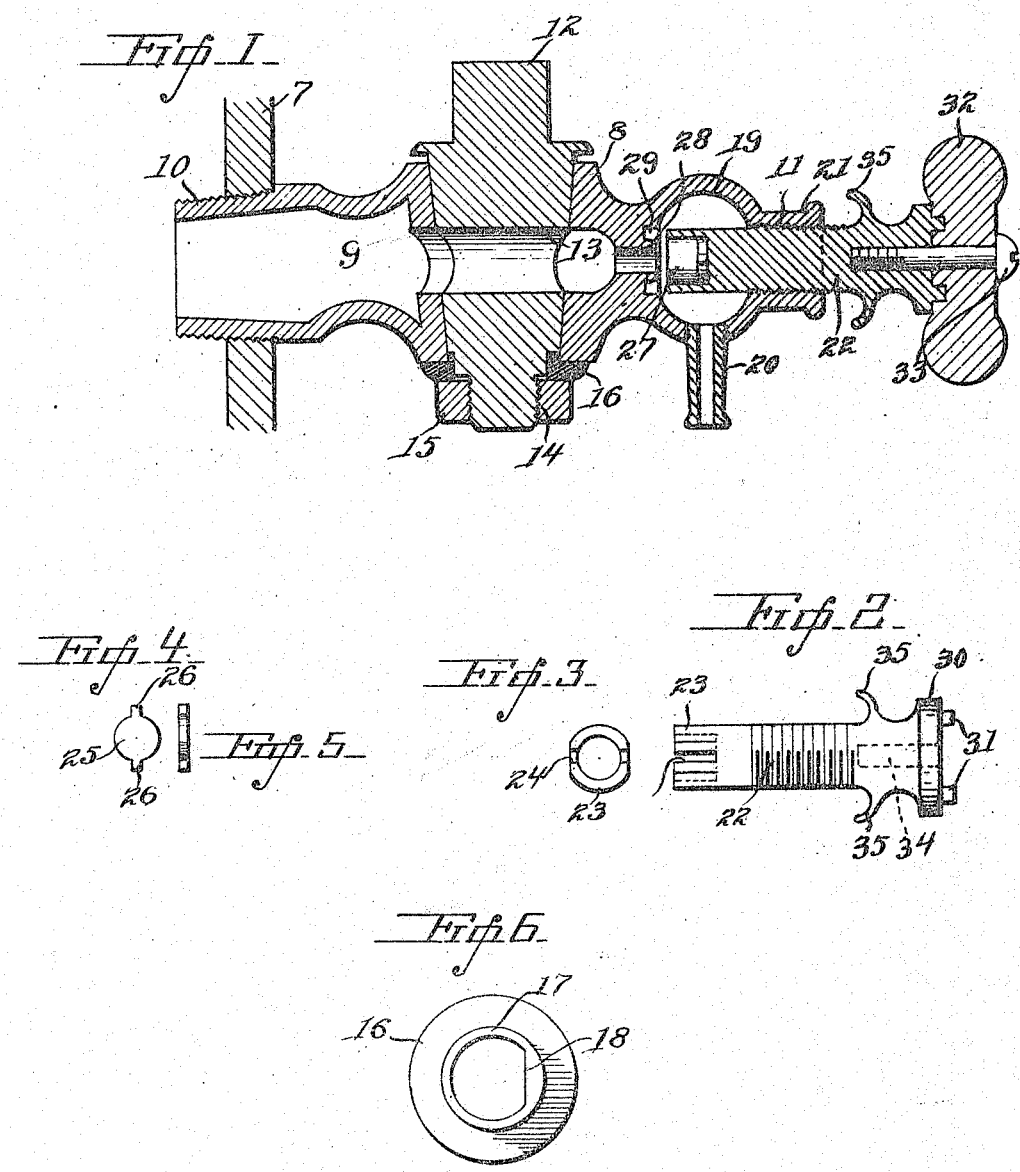

ROBERT I. HOGLE, OF CASTELLA, CALIFORNIA.

GAGE-COCK.

1,128,982.   Specification of Letters Patent.   Patented Feb. 16, 1915.

Application filed December 27, 1913. Serial No. 809,102.

*To all whom it may concern:*

Be it known that I, ROBERT I. HOGLE, a citizen of the United States, residing at Castella, in the county of Shasta and State of California, have invented certain new and useful Improvements in Gage-Cocks, of which the following is a specification.

This invention relates to gage cocks having for its primary object to provide a suitable axial alined adjustable valve element with which is associated a suitable detachable slug which engages with the valve seat in the valve housing.

Another object of this invention is to associate with the valve suitable means by which the slug is removed when the same has become inapt for use or the like.

A further object of the invention is to associate with the valve suitable finger lugs in order to facilitate the actuation of the valve in the valve housing so as to close communication therethrough when desired.

Other objects as well as the nature, characteristic features and scope of my invention will be more readily understood from the following description taken in connection with the accompanying drawings and pointed out in the claims forming a part of this specification.

Referring to the drawings:—Figure 1 is a longitudinal sectional view of the device constructed in accordance with my invention illustrating the application thereof; Fig. 2 is a side elevation of my improved valve member; Fig. 3 is an end elevation of the same; Fig. 4 is a front elevation of the slug removing disk; Fig. 5 is a side elevation of the same; and Fig. 6 is a top plan view of the improved washer used in the present invention.

In the drawings, wherein is illustrated the preferred embodiment of this invention, in order to illustrate the application thereof, a portion of a boiler 7 is provided which has formed therein a screw-threaded aperture with which is engaged one end of my improved gage cock 8, said gage cock in the present instance being provided with a longitudinally extending opening 9 which extends the entire length thereof as shown to advantage in Fig. 1. One end of the gage cock 8 is provided with external screw threads 10 which engage with the screw threads of the boiler 7 while the opposite end thereof is provided with internal screw threads 11. Mounted for movement in the cock 8 is an ordinary turning plug 12 which is provided with an opening 13 therethrough adapted for alinement, at times, with the opening 9 of the gage cock, the lower end of said turning plug 12 being reduced and provided with external screw threads 14 which are adapted for engagement with a nut 15. In order to provide a fluid tight connection, a metal washer 16 is provided which is preferably made of lead and is provided with an annular collar 17 on one face thereof which is formed by extending a portion of the washer upwardly at right angles to the body, the outer periphery of said collar 17 being snugly engaged with the inner periphery of the gage cock 8 which is provided by the mounting of the turning plug 12 therein, the lower end of the turning plug 12 having an annular portion thereof cut away so as to provide a seat with which said collar 17 is engaged, the body portion of the washer being engaged with the bottom of the cock 8 while the outer face thereof is engaged with the inner face of the washer 15. As shown to advantage in Fig. 6, the collar 17 has an enlarged portion 18 formed on the inner periphery thereof so as to prevent movement of the washer on the turning block 12.

A portion of the gage cock 8 adjacent the outer end thereof is enlarged so as to provide a substantially spherical portion 19 which has detachably associated therewith an outlet tube 20, said spherical portion 19 having extending therefrom a nipple 21 in which is formed the screw threads 11, previously mentioned, which are adapted for screw-threaded engagement with my improved valve element 22, the latter in the present instance being preferably of a cylindrical configuration, having the inner end thereof provided with an annular recess 23, said recess provided with oppositely disposed longitudinally extending grooves 24 as advantageously illustrated in Figs. 2 and 3. Mounted in the terminal of the recess 23 is a disk 25 which is preferably made of a hardened metal such as brass and has extending from the periphery thereof a pair of diametrically opposite lugs 26, said lugs being engaged with the slots 24 and extending in a plane beyond the periphery of said valve 22. A slug 27 is arranged in the recess 23 exterior of the disk 26, said slug being preferably made of lead and adapted for engagement with a nipple 28, the latter being formed by cutting out a portion of the gage cock 8 adjacent the spherical portion 10 so as to provide an annular groove 29 with which is engaged the recessed end of the valve 22. The outer end of the valve 22 is preferably enlarged to provide a disk 30 which has mounted on the outer face thereof adjacent its periphery a pair of locking teeth 31 which are adapted for engagement in corresponding recesses in the operating handle 32. The handle 32 is preferably made of wood and is detachably associated with the disk 30 through the medium of a bolt 33, the latter being provided with the threaded shank which is engaged with a threaded recess 34 of the valve 22. In order to facilitate the actuation of the valve 22 in the screw threaded end 11 of the gage cock 8 a plurality of finger lugs 35 are formed on the periphery of the valve 22 adjacent the disk 30, said lugs 35 being preferably of an arcuate configuration in order to conform to the curvature of the fingers of the operator.

In operation, we will assume that the opening 13 of the turning plug 12 is in axial alinement with the opening 9 of the gage cock 8 and that the valve 22 is threaded so that the slug 27 thereof is snugly in engagement with the nipple 28. In this case it is seen that the contents of the boiler 7 may be carried as far as the nipple 28 but will be prevented from communication through its outlet 20 by the valve 22. However, as the valve 22 is unthreaded communication will be established through the opening 9 in the gage cock 8, the opening 13 in the turning block 12 and through the nipple 27 and the outlet tube 20 of the spherical portion 19. It is obvious that by the constant engaging of the slug 27 with the nipple 28 that the same will after a certain length of time become inapt for use thereby necessitating the removal of the same therefrom which may be readily done by merely closing the communication through the gage cock 8. Communication is closed by exerting pressure on the turning plug 12 through the medium of a wrench or any suitable tool so as to cause the opening 13 of the turning plug 12 to be thrown out of alinement with the opening 9 of the gage cock 8. Pressure is then exerted on the handle 32 so as to cause the valve 22 to be actuated in the nipple 21 until the same has been removed from its engagement with the threads 11. The slug 27 is then removed by actuating the disk 25 in the opening 23 by exerting pressure on the lugs 26.

It will be understood that the above description and accompanying drawings comprehend only the general and preferred embodiment of my invention and that various minor changes in detail of construction, proportion and arrangement of the parts may be made within the scope of the appended claims and without sacrificing any of the advantages of my invention.

Having thus fully described my invention, what I claim as new and desire to secure by Letters Patent is:—

1. A gage cock including a valve housing having a portion thereof formed to provide a valve seat, a valve adjustably mounted in said housing and provided with a recess therein, a slug mounted in said recess, to engage the valve seat, and a disk arranged subjacent the slug and provided with laterally extending lugs projecting beyond the valve, to facilitate removal of the slug when the latter has been rendered inapt for use.

2. A gage cock including a valve housing having a valve seat, a valve mounted in said housing, one end of which is provided with a recess, a slug mounted in said recess for engagement with said valve seat, and a disk mounted in said recess beneath said slug having lugs extending therefrom, at diametrically opposite points and extending through the longitudinal extending slots in said valve for the purpose specified.

In testimony whereof I affix my signature in presence of two witnesses.

ROBERT I. HOGLE.

Witnesses:
CALVIN McDONALD,
H. R. HUDSON.